(12) United States Patent  (10) Patent No.: US 8,009,637 B2
Harris et al.  (45) Date of Patent: Aug. 30, 2011

(54) METHOD AND APPARATUS FOR SPREADING CHANNEL CODE SELECTION

(75) Inventors: John M. Harris, Chicago, IL (US); Vijay G. Subramanian, Dublin (IE)

(73) Assignee: Motorola Solutions, Inc., Schaumburg, IL (US)

(*) Notice: Subject to any disclaimer, the term of this patent is extended or adjusted under 35 U.S.C. 154(b) by 867 days.

(21) Appl. No.: 11/624,428

(22) Filed: Jan. 18, 2007

(65) Prior Publication Data

US 2007/0211787 A1  Sep. 13, 2007

Related U.S. Application Data

(60) Provisional application No. 60/781,527, filed on Mar. 10, 2006.

(51) Int. Cl.
*H04B 7/216* (2006.01)

(52) U.S. Cl. ...... 370/335; 455/450; 455/451; 455/452.2; 455/453; 455/509; 370/209; 370/329; 370/341; 370/342; 370/203; 370/330; 370/441; 375/130; 375/133; 375/140; 375/141; 375/149

(58) Field of Classification Search ............ 370/335, 370/342, 431, 441, 208, 209, 203, 328, 329, 370/330, 341; 455/67.11, 67.13, 436, 450, 455/451, 452.1, 452.2, 69, 453, 509, 513; 375/130, 133, 140, 141, 149
See application file for complete search history.

(56) References Cited

U.S. PATENT DOCUMENTS

| | | | |
|---|---|---|---|
| 6,185,423 B1 * | 2/2001 | Brown et al. | 455/434 |
| 6,522,658 B1 * | 2/2003 | Roccanova | 370/441 |
| 6,594,248 B1 * | 7/2003 | Karna et al. | 370/342 |
| 6,741,582 B1 * | 5/2004 | Mansour | 370/342 |
| 6,743,395 B2 * | 6/2004 | Fukunaga et al. | 419/23 |
| 6,993,065 B2 * | 1/2006 | Li et al. | 375/146 |

(Continued)

FOREIGN PATENT DOCUMENTS

| | | |
|---|---|---|
| EP | 1230748 B1 | 10/2005 |
| KR | 10-0389818 B1 | 7/2003 |
| WO | 2005018131 A2 | 2/2005 |
| WO | 2006019710 A1 | 2/2006 |

OTHER PUBLICATIONS

Blaine R. Copenheaver, "Corresponding Application PCT/US07/062377—PCT International Search Report and Written Opinion," WIPO, ISA/US, Commissioner for Patents, Alexandria, VA, USA, Mar. 17, 2008, 11 pages, most relevant pp. 4-5 and 9-10.

(Continued)

*Primary Examiner* — Olumide T Ajibade Akonai
(74) *Attorney, Agent, or Firm* — Jeffrey K. Jacobs; Brian Mancini; Daniel R. Bestor (57) ABSTRACT

Various embodiments are described which may serve to improve spreading channel code selection in wireless technologies that employ two-stage ranging. For example, some of the embodiments enable a number of spreading codes to be reused at each network node (111, 112), potentially increasing the number of codes available to each remote unit and thereby reducing the collision rate. Rather than simply selecting a spreading channel code randomly, remote units (101-103), in some embodiments, select a spreading channel code based on one or more considerations such as pilot signal strength, remote unit location, a remote unit mobility level, and a priority class associated with the remote unit. Depending on the embodiment, network nodes can partition the spreading codes into groups and then assign link bandwidth to remote units based on the group associated with the code selected by that remote unit.

13 Claims, 5 Drawing Sheets

U.S. PATENT DOCUMENTS

| | | | |
|---|---|---|---|
| 6,996,056 B2 | 2/2006 | Chheda et al. | |
| 7,061,890 B2 * | 6/2006 | Kim et al. | 370/335 |
| 7,088,673 B2 * | 8/2006 | Horne | 370/209 |
| 7,133,353 B2 * | 11/2006 | Sourour et al. | 370/208 |
| 7,450,556 B2 * | 11/2008 | Shen et al. | 370/342 |
| 7,554,965 B2 * | 6/2009 | Karaoguz | 370/342 |
| 2003/0043774 A1 * | 3/2003 | Hamalainen et al. | 370/342 |
| 2003/0112744 A1 * | 6/2003 | Baum et al. | 370/206 |
| 2004/0071115 A1 * | 4/2004 | Earnshaw et al. | 370/335 |
| 2005/0002357 A1 * | 1/2005 | Hu et al. | 370/332 |
| 2005/0030931 A1 | 2/2005 | Sung et al. | |
| 2005/0058058 A1 * | 3/2005 | Cho et al. | 370/208 |
| 2007/0060180 A1 * | 3/2007 | Muharemovic et al. | 455/509 |

OTHER PUBLICATIONS

Nora Lindner, "Corresponding Application PCT/US2007/062377—PCT International Preliminary Report on Patentability," The International Bureau of WIPO, Geneva, Switzerland, Sep. 25, 2008, 7 pages, most relevant pp. 2, 6-7.

Korean Examiner, "KIPO's Notice of Preliminary Rejection," Korean Intellectual Property Office, Daejeon, Republic of Korea, May 31, 2010, 6 pages, most relevant pp. 1- 2.

Japanese Office Action Dated Apr. 19, 2011 for Counterpart Application.

* cited by examiner

METHOD AND APPARATUS FOR SPREADING CHANNEL CODE SELECTION

REFERENCE(S) TO RELATED APPLICATION(S)

The present application claims priority from provisional application, Ser. No. 60/781,527, entitled "METHOD AND APPARATUS FOR SPREADING CHANNEL CODE SELECTION," filed Mar. 10, 2006, which is commonly owned and incorporated herein by reference in its entirety.

FIELD OF THE INVENTION

The present invention relates generally to communications and, in particular, to spreading channel code selection in communication systems.

BACKGROUND OF THE INVENTION

Currently, standards bodies such as 3GPP (3rd Generation Partnership Project) and 3GPP2 (3rd Generation Partnership Project 2) are developing standards specifications for wireless telecommunications systems. (These groups may be contacted via http://www.3gpp.org/ and http://www.3gpp2.com/, respectively.) In particular, proposals for new physical layer link descriptions are being developed and submitted for consideration. In general, wireless technologies that employ spreading and two-stage ranging rely on remote units to randomly select a spreading channel code to use with their initial ranging signal. The limited number of ranging codes and the frequency of collisions between units using the same code for access degrade the performance of user services (greater access delays, e.g.) and diminish user experience, particularly with time sensitive services such as push-to-talk. Accordingly, it would be desirable to have an improved method and apparatus for spreading channel code selection applicable to these wireless technologies.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, unless specifically indicated, the order and grouping of signaling is not a limitation of other embodiments that may lie within the scope of the claims Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described which may serve to improve spreading channel code selection in wireless technologies that employ two-stage ranging. For example, some of the embodiments enable a number of spreading codes to be reused at each network node, potentially increasing the number of codes available to each remote unit and thereby reducing the collision rate. Rather than simply selecting a spreading channel code randomly, remote units, in some embodiments, select a spreading channel code based on one or more considerations such as pilot signal strength, remote unit location, a remote unit mobility level, and a priority class associated with the remote unit. Depending on the embodiment, network nodes can partition the spreading codes into groups and then assign link bandwidth to remote units based on the group associated with the code selected by that remote unit.

Figure 1:
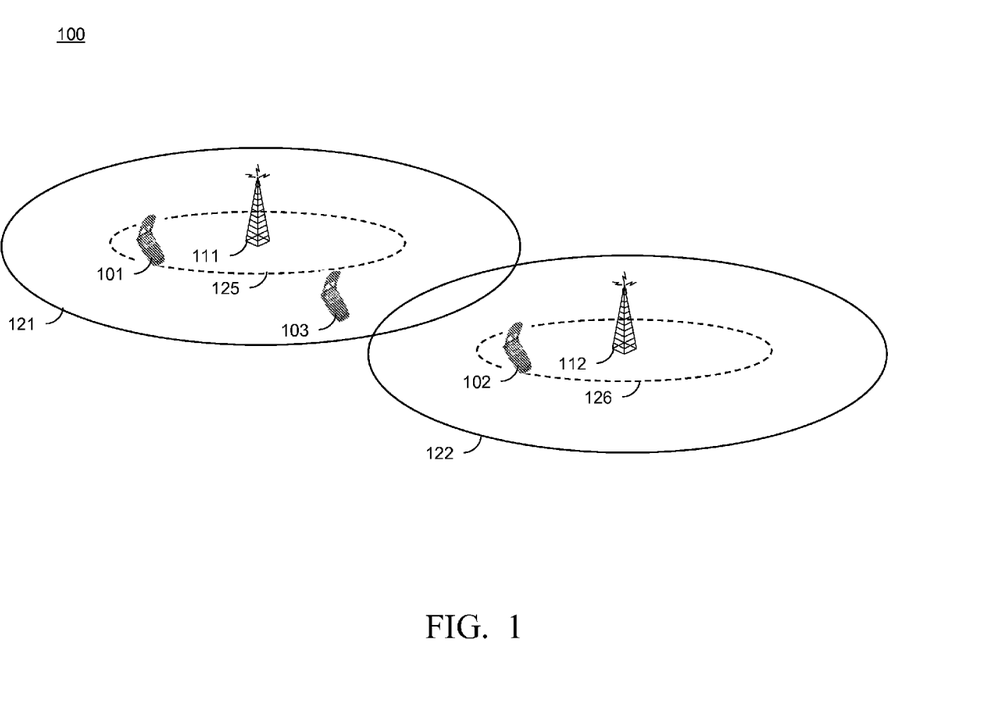
FIG. 1 is a depiction of a wireless communication system in accordance with multiple embodiments of the present invention.
Figure 2:
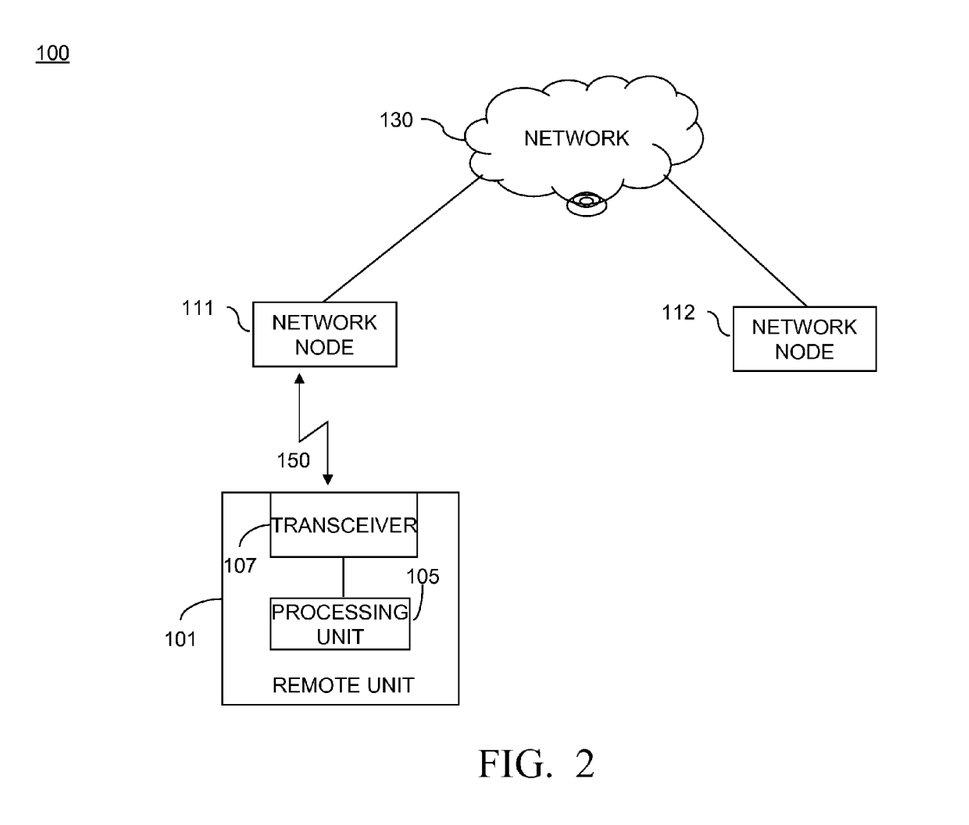
FIG. 2 is a block diagram depiction of the wireless communication system of FIG. 1, in accordance with multiple embodiments of the present invention.

The disclosed embodiments can be more fully understood with reference to FIGS. 1-5. FIGS. 1 and 2 depict a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication system 100 represents a system having an architecture in accordance with one or more of the 3GPP2 technologies, suitably modified to implement the present invention. Alternative embodiments of the present invention may be implemented in communication systems that employ other or additional technologies such as, but not limited to, those described in the 3GPP specifications and/or those described in the IEEE's 802.xx specifications (e.g., 802.16).

Communication system 100 is depicted in a very generalized manner, shown to comprise network nodes 111 and 112, remote units 101-103, and network 130. Those skilled in the art will recognize that FIGS. 1 and 2 do not depict all of the network equipment necessary for system 100 to operate but only those system components and logical entities particularly relevant to the description of embodiments herein. For example, depending on the embodiment, network 130 may represent an IP (internet protocol) network or, in combination with network nodes 111 and 112, a radio access network (RAN) or access network (AN). Thus, depending on the embodiment, network nodes 111 and 112 may comprise base transceiver stations (BTSs), access points (APs), and/or higher order devices such as base stations (BSs) (which include BTSs and base site controllers (BSCs)) and WLAN (wireless local area network) stations (which include APs, AP controllers/switches, and/or WLAN switches); however, none of these devices are specifically shown in FIGS. 1 or 2.

In FIG. 2, remote unit 101 and network node 111 are shown communicating via technology-dependent, wireless interface 150. Remote units, or user equipment (UEs), may be thought of as mobile stations (MSs); however, remote units are not necessarily mobile nor able to move. In addition, remote unit/UE platforms are known to refer to a wide variety of consumer electronic platforms such as, but not limited to, mobile stations (MSs), access terminals (ATs), terminal equipment, mobile devices, gaming devices, personal computers, personal digital assistants (PDAs). In particular, remote unit 101 comprises processing unit 105, and transceiver 107. Depending on the embodiment, remote unit 101 may additionally comprise a keypad (not shown), a speaker (not shown), a microphone (not shown), and a display (not shown). Processing units, transceivers, keypads, speakers, microphones, and displays as used in UEs are all well-known in the art.

In general, components such as transceivers, keypads, speakers, microphones, and displays are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, remote unit 101 represents a known device that has been adapted, in accordance with the description herein, to implement multiple embodiments of the present invention.

Furthermore, those skilled in the art will recognize that aspects of the present invention may be implemented in and across various physical components and none are necessarily limited to single platform implementations. For example, the network aspects may be implemented in or across one or more network devices, such as in network node 111 or across one or more network nodes and/or network 130.

Operation of embodiments in accordance with the present invention occurs substantially as follows. Processing unit 105 of remote unit 101 receives signaling from network node 111 via wireless interface 150 and transceiver 107. In most embodiments, the received signaling is pilot information conveyed via a pilot channel of network node 111. In wireless technologies that employ spreading and two-stage ranging, prior art remote units randomly select a spreading channel code to use with their initial ranging signal. In contrast, processing unit 105 of remote unit 101 selects a spreading channel code based on one or more considerations, depending on the particular embodiment. These considerations include the signal strength of the received signaling, the current location of the remote unit, the current mobility level of the remote unit, and/or the current priority class associated with the remote unit. Having selected a spreading channel code, processing unit 105 then transmits, via transceiver 107 and wireless interface 150, an initial access signal using the spreading channel code selected. This initial access signal may take the form of a ranging signal, for example, or other technology-dependent signaling required access the network node.

What type of spreading channel codes are selected and used also varies from one technology to the next. The spreading channel codes may be orthogonal or quasi-orthogonal, although they need not be either, such as the spreading codes specified in IEEE 802.16e. As another example, the spreading channel codes may be based on Chu sequences as described in U.S. Provisional Application 60/759,697, filed Jan. 17, 2006, entitled "PREAMBLE SEQUENCING FOR RANDOM ACCESS CHANNEL IN A COMMUNICATION SYSTEM," and hereby incorporated by reference.

In some embodiments, network node 111 partitions the spreading channel codes that it makes available to remote units into code groups and transmits an indication of both the spreading channel codes available for use and the code group with which each is associated. This is information may be broadcast and received by remote unit 101 via a pilot channel of network node 111. Obviously, there are a great many ways to indicate the spreading channel codes and their associated code groups to remote units. The specific format of this signaling will, of course, depend upon how much information the remote units already have regarding the nature and identity of the code set used system-wide and used by the particular network node itself.

Thus, remote unit 101 receives signaling that indicates which spreading channel codes may be used by the remote unit for accessing network node 111 and the associated groupings of the codes. In these embodiments, then, processing unit 105 determines a particular code group from which to select a spreading channel code to use. Depending on the embodiment, remote unit 101 may determine a particular code group based on one or more considerations such as a received signal strength (the pilot signal strength, e.g.) from network node 111, the current location of remote unit 101, the current mobility level of remote unit 101, and/or a current priority class associated with remote unit 101.

This determination may be guided by the remote unit characteristics that individual code groups are intended to target. For example, one code group may be targeted for remote units that are associated with a particular priority class, i.e. a particular level of service. This could allow codes to be "set aside" for users who have purchased a premium level service or users who are involved in responding to emergencies, for example.

Code groups could also be targeted for remote units in a particular area. For example, a code group might target remote units inside (or outside) region 125 around network node 111. Or a code group may target an area of particular interest such as that around a stadium, convention center, highway, shopping center, auditorium, conference room, etc. Code groups could also target remote units having a particular level of mobility. For example, one code group may target low-mobility units while another targets high-mobility units.

Another characteristic that individual code groups may be intended to target is remote unit received signal strength, this being of signaling from the network node such as pilot signaling that is received by the remote unit. (Signal strength is used throughout this description to generically refer to the various forms of signal measurement that are used such as signal quality measurements, measurements for CQI (channel quality indicator), and/or unique metrics derived from various combinations of both). One example of code groups targeting remote unit received signal strength would be for network node 111 to target one code group for units that have a received signal strength above a particular threshold and another code group for units that have a received signal strength below the particular threshold.

In effect, then, network node 111 could target one code group for coverage region 125 (roughly) and another for the remainder of coverage area 121. (Note that a similar effect could be achieved using remote unit location, as described above.) Partitioning the spreading channel codes into code groups that are targeted for particular coverage regions can enable greater code reuse than is believed available today. For example, the spreading channel codes of one or more code groups targeting wireless coverage region 125, for instance, can be reused by network nodes with wireless coverage areas adjacent to network node 111. Thus, since interference is not a problem between coverage regions 125 and 126, network nodes 111 and 112 can reuse the spreading channel codes targeted for these regions. Potentially, then, for a subset of the spreading channel codes a 1:1 reuse pattern could be used.

Additionally or alternatively, network node 111 may monitor a system loading level and partition the spreading channel codes into code groups based on the current system load. For example, network node 111 may partition the spreading channel codes into more code groups when the system loading level is greater than a loading threshold. Examples of system loading level indicators that may be used include the number of collisions per code/code group, the number of transmissions per code/code group (equivalently utilization of codes/code groups), recent changes in the number of users attached to the cell in different cell groups (predicting/anticipating a significant change in pattern), etc. The benefit sought by considering the level of system loading is that by partitioning more code groups and having the remote unit selecting the appropriate code group, the system can save capacity by using information from the remote unit indicating how large a resource assignment it needs. In other words, if there are only two groups, then the network will still end up doing a fair bit of over assignment of resources for mobiles which are very close to the network node, as the network may think that they are as far away as halfway out within the cell. However, by partitioning 10 different groups, then the network can know that the user who is very near the tower is within the closest $\frac{1}{10}$ or so of the cell/sector and thus can use an even smaller assignment. The downside of breaking the codes into more groups is that of potentially creating more collisions within one group while another group is under-utilized. However, this can be addressed by dividing the unit among code groups in different time intervals.

Thus, depending on the embodiment, remote unit 101 may determine a particular code group based on one or more considerations such as a received signal strength from network node 111, the current location of remote unit 101, the current mobility level of remote unit 101, and/or a current priority class associated with remote unit 101. As discussed above, this determination may be guided by the remote unit characteristics that individual code groups are intended to target. Network node 111 may also indicate to remote unit 101, in addition to the codes and the code groupings, what characteristics the code groups are intended to target.

Using this received information or some pre-defined information regarding the targeted characteristics of the code groups, remote unit 101 determines a particular code group from which to select a spreading channel code. In some embodiments, processing unit 105 simply selects a spreading channel code randomly from the spreading channel codes associated with the determined group. Thus, the selection of a spreading channel code based on various considerations may be performed by determining a code group, based on the particular considerations, and then selecting, perhaps randomly, a spreading channel code from the determined code group.

A number of examples of remote unit characteristics for which code groups could be targeted was provided above. Thus, remote unit 101 considers the applicable characteristics or combination of characteristics that the available code groups target to determine a code group from which to select a code. For example, remote unit 101 may determine to select from one code group because of the remote unit's current location (per GPS, e.g.) or because the user has purchased a premium service level. In another embodiment, remote unit 101 may determine to select from a particular code group because the pilot signal strength of network node 111 is greater than a threshold and because remote unit 101 currently has a low level of mobility. Another code group may be determined for selection in the case that either the pilot signal strength is below the threshold or if remote unit 101 has a mobility level above a mobility threshold. This is just one example of the many possible combinations of characteristics that code groups might target to effect a partitioning of the spreading codes.

Depending on the embodiment, however, remote units may not be locked into selecting a spreading channel code from the code group targeted by the applicable remote unit characteristics. For example, remote unit 101 may determine the code group that applies to its current situation, select a code to use from that code group, and then determine that the code selected is being used by another device. In such a case, remote unit 101 may select another code from the determined code group or may select a code from another code group altogether.

Some other embodiment-specific aspects that may be incorporated into the embodiments already described follow. The spreading channel codes that are partitioned into groups, while unique as codes, may share a common modulation and coding type. Thus, when a remote unit, in this case, selects a spreading channel code, it is not selecting a level of redundancy or a type of modulation/data rate.

In addition to selecting a spreading channel code, in some embodiments the remote unit will select the spreading channel code and a time period for using the spreading channel code. In other words, the remote unit selects a code-time combination (e.g., a code and a start time) from a group of code-time combinations. Thus, the available code-time combinations are partitioned into groups just as the codes alone would be, except that the same codes may be in different groups but associated with different time periods for use. Determination of a group of code-time combinations from which to select could occur as described herein for code groups.

After network node 111 receives an initial access signal from remote unit 101 using the spreading channel code selected by remote unit 101, network node 111 may assign an amount of link bandwidth (forward and/or reverse link bandwidth) to the remote unit based on the code group of the spreading channel code used. For example, in a case in which the code group has been targeted for a level of signal strength of a signal received by the remote unit greater than a threshold and the remote unit uses a spreading channel code from that code group, the network node may assign a smaller amount of link bandwidth to the remote unit than would be otherwise assigned. Here, the network node may assume that the smaller amount of link bandwidth will be sufficient since the remote unit has signal strength greater than the threshold, as indicated by the spreading channel code the remote unit used. Potentially then, using this technique, less bandwidth may be used in certain situations, improving system capacity.

Figure 3:
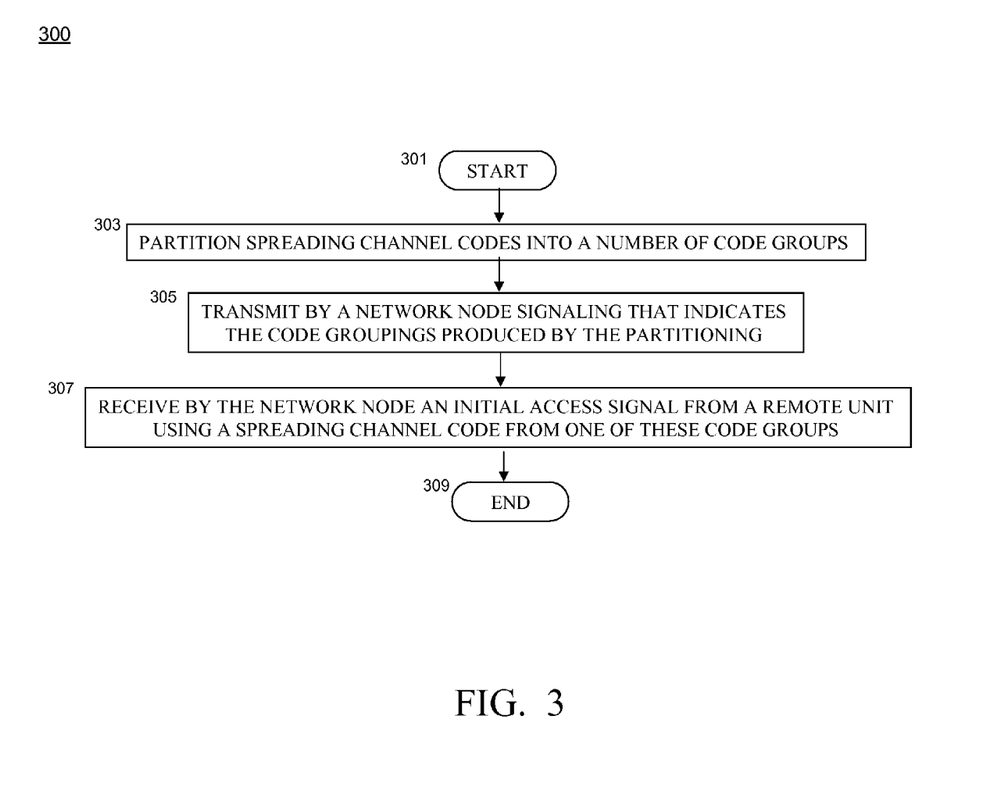
FIG. 3 is a logic flow diagram of functionality performed by a network in accordance with multiple embodiments of the present invention.

FIG. 3 is a logic flow diagram of functionality performed by a network in accordance with multiple embodiments of the present invention. Logic flow 300 begins (301) with the network partitioning (303) a plurality of spreading channel codes into a plurality of code groups. The network then transmits (305) signaling that indicates the code groupings produced by the partitioning and receives an initial access signal from a remote unit using a spreading channel code from a code group of the plurality of code groups. Logic flow 300 then ends (309).

Figure 4:
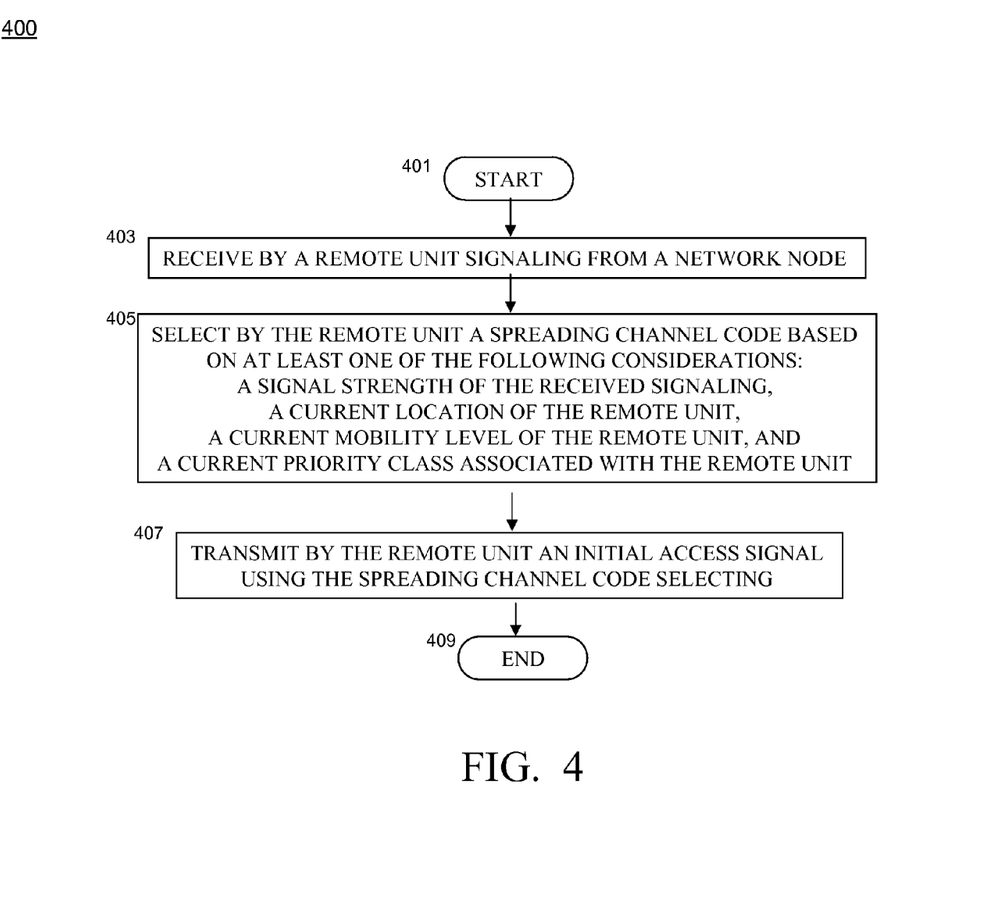
FIG. 4 is a logic flow diagram of functionality performed by a remote unit in accordance with multiple embodiments of the present invention.

FIG. 4 is a logic flow diagram of functionality performed by a remote unit in accordance with multiple embodiments of the present invention. Logic flow 400 begins (401) when a remote unit receives (403) signaling from a network node. The remote unit selects (405) a spreading channel code based on at least one characteristic from a group of a signal strength of the received signaling, a current location of the remote unit, a current mobility level of the remote unit, and a current priority class associated with the remote unit. The remote unit then transmits (407) an initial access signal using the spreading channel code. Logic flow 400 then ends (409).

Figure 5:
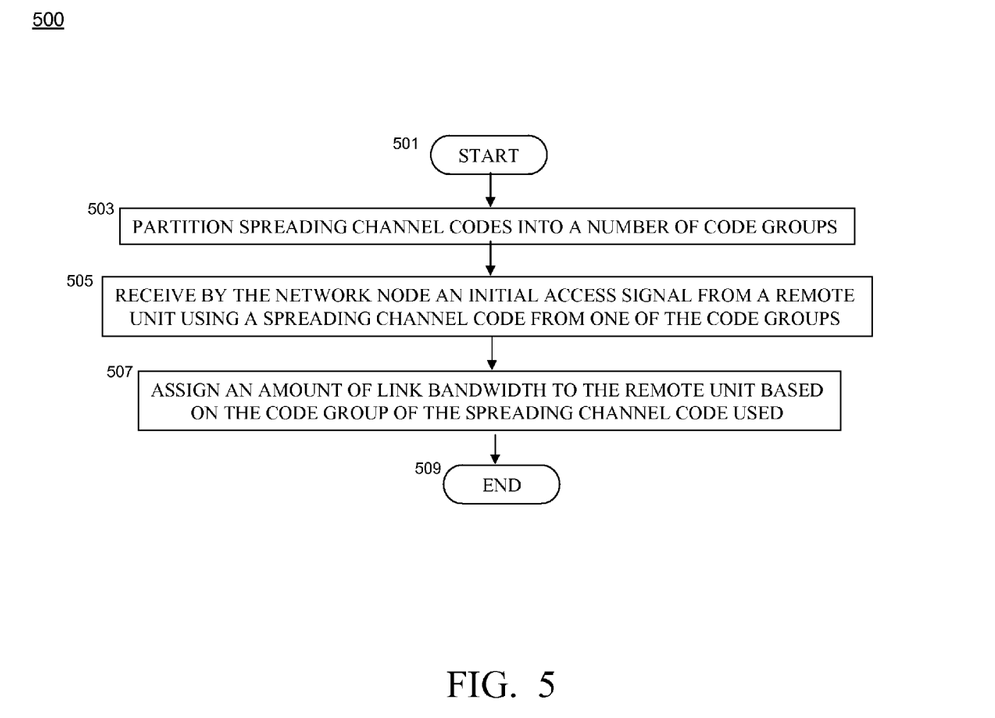
FIG. 5 is a logic flow diagram of functionality performed by a network in accordance with multiple embodiments of the present invention.

FIG. 5 is a logic flow diagram of functionality performed by a network in accordance with multiple embodiments of the present invention. Logic flow 500 begins (501) with the network partitioning (503) a plurality of spreading channel codes into a plurality of code groups. The network then receives (505) an initial access signal from a remote unit using a spreading channel code from a code group of the plurality of code groups. In response, the network assigns (507) an amount of link bandwidth to the remote unit based on the code group of the spreading channel code used by the remote unit. Logic flow 500 then ends (509).

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for spreading channel code selection, the method comprising:
receiving by a remote unit signaling from a network node that indicates groupings of the spreading channel codes that the remote unit may use for accessing the network node;
selecting by the remote unit a spreading channel code from a determined group of the indicated groupings, wherein the determined group is determined based on at least one characteristic from a group of: a signal strength of the received signaling and a current location of the remote unit; and
transmitting by the remote unit an initial access signal using the spreading channel code.

2. The method of claim 1 wherein the initial access signal comprises a ranging signal.

3. The method of claim 1 wherein receiving by the remote unit signaling from the network node comprises receiving by the remote unit signaling via a pilot channel of the network node.

4. The method of claim 1 wherein selecting by the remote unit the spreading channel code from the determined group comprises randomly selecting by the remote unit the spreading channel code from the determined group.

5. The method of claim 1 wherein a common modulation and coding type is associated with each of the indicated groupings of spreading channel codes.

6. The method of claim 1 further comprising:
when the remote unit determines that the spreading channel code selected is being used by another device, selecting by the remote unit a spreading channel code from a group of the indicated groupings other than the determined group.

7. The method of claim 1:
wherein selecting by the remote unit the spreading channel code comprises selecting by the remote unit the spreading channel code and a time period for using the spreading channel code; and
wherein transmitting by the remote unit the initial access signal using the spreading channel code comprises transmitting by the remote unit the initial access signal using the spreading channel code during the time period.

8. The method of claim 7 wherein selecting by the remote unit the spreading channel code and the time period for using the spreading channel code comprises:
selecting by the remote unit a code-time combination from a determined group of code-time combinations;
wherein the determined group is one of a plurality of groups of code-time combinations that may be used by the remote unit for accessing the network node; and
wherein the determined group is determined based on at least one characteristic from a group of: a signal strength of the received signaling, a current location of the remote unit, a current mobility level of the remote unit, and a current priority class associated with the remote unit.

9. A method for controlling spreading channel code selection, the method comprising:
partitioning a plurality of spreading channel codes into a plurality of code groupings that a remote unit may use for accessing a network node;

transmitting by the network node signaling that indicates the code groupings produced by the partitioning; and receiving by the network node an initial access signal from a remote unit using a spreading channel code selected from a determined code group of the plurality of code groupings, wherein the determined code group is determined based on at least one characteristic from a group of: a signal strength of the received signaling and a current location of the remote unit.

10. The method of claim 9 further comprising:

reusing, by at least one adjacent network node, spreading channel codes from at least one code group of the plurality of code groups, wherein the at least one adjacent network node comprises at least one network node having a wireless coverage area adjacent to the network node.

11. The method of claim 9 wherein partitioning a plurality of spreading channel codes into a plurality of code groups comprises:

determining whether a system loading level is greater than a loading threshold; and partitioning the plurality of spreading channel codes into a plurality of code groups such that a greater number of code groups are formed when the system loading level is greater than the loading threshold than are formed when the system loading level is not greater than the loading threshold.

12. A method for spreading channel code selection, the method comprising:

partitioning a plurality of spreading channel codes into a plurality of code groupings;

receiving by the network node an initial access signal from a remote unit using a spreading channel code selected from a determined of the plurality of code groupings, wherein the determined code group is determined based on at least one characteristic from a group of: a level of signal strength of a signal received by the remote unit from the network node, a current location of the remote unit, a current mobility level of the remote unit, and a current priority class associated with the remote unit; and assigning an amount of link bandwidth to the remote unit based on the code group of the spreading channel code used by the remote unit, wherein when the code group is associated with a level of signal strength of a signal received by the remote unit from the network node that is greater than a signal strength threshold, assigning a smaller amount of link bandwidth to the remote unit than would be otherwise assigned.

13. A remote unit comprising:

a transceiver; and a processing unit, communicatively coupled to the transceiver, and:

adapted to receive, via the transceiver, signaling from a network node that indicates groupings of the spreading channel codes that the remote unit may use for accessing the network node;

adapted to select a spreading channel code from a determined group of the indicated groupings, wherein the determined group is determined based on at least one characteristic from a group of: a signal strength of the received signaling and a current location of the remote unit; and adapted to transmit, via the transceiver, an initial access signal using the spreading channel code.

* * * * *